US010800896B2

(12) United States Patent
Shepherd et al.

(10) Patent No.: US 10,800,896 B2
(45) Date of Patent: Oct. 13, 2020

(54) SYNTACTIC FOAM

(71) Applicant: Advanced Insulation Plc, Gloucester, Gloucestershire (GB)

(72) Inventors: Simon Harry Shepherd, Gloucester (GB); Peter John Mellersh, Gloucester (GB)

(73) Assignee: ADVANCED INSULATION LIMITED (GB)

( * ) Notice: Subject to any disclaimer, the term of this patent is extended or adjusted under 35 U.S.C. 154(b) by 244 days.

(21) Appl. No.: 15/580,156

(22) PCT Filed: Jun. 2, 2016

(86) PCT No.: PCT/GB2016/051626
§ 371 (c)(1),
(2) Date: Dec. 6, 2017

(87) PCT Pub. No.: WO2016/198837
PCT Pub. Date: Dec. 15, 2016

(65) Prior Publication Data
US 2018/0155519 A1 Jun. 7, 2018

(30) Foreign Application Priority Data
Jun. 8, 2015 (GB) .................................. 1509865.0

(51) Int. Cl.
C08J 9/32 (2006.01)
C08J 9/00 (2006.01)
B32B 29/00 (2006.01)
B32B 27/12 (2006.01)
B32B 27/06 (2006.01)
B32B 27/10 (2006.01)
B32B 5/02 (2006.01)
B32B 5/18 (2006.01)
B32B 15/08 (2006.01)
B32B 27/42 (2006.01)

(52) U.S. Cl.
CPC .................. *C08J 9/32* (2013.01); *B32B 5/02* (2013.01); *B32B 5/18* (2013.01); *B32B 15/08* (2013.01); *B32B 27/065* (2013.01); *B32B 27/10* (2013.01); *B32B 27/12* (2013.01); *B32B 27/42* (2013.01); *B32B 29/00* (2013.01); *C08J 9/0014* (2013.01); *C08J 9/0023* (2013.01); *C08J 9/0033* (2013.01); *C08J 9/0038* (2013.01); *C08J 9/0061* (2013.01); *C08J 9/0066* (2013.01); *C08J 9/0085* (2013.01); *C08J 9/0095* (2013.01); *B32B 2255/102* (2013.01); *B32B 2255/26* (2013.01); *B32B 2262/065* (2013.01); *B32B 2262/10* (2013.01); *B32B 2262/101* (2013.01); *B32B 2262/105* (2013.01); *B32B 2262/106* (2013.01); *B32B 2264/065* (2013.01); *B32B 2264/101* (2013.01); *B32B 2264/108* (2013.01); *B32B 2307/30* (2013.01); *B32B 2307/306* (2013.01); *B32B 2307/3065* (2013.01); *B32B 2307/714* (2013.01); *B32B 2307/732* (2013.01); *C08J 2201/022* (2013.01); *C08J 2207/00* (2013.01); *C08J 2361/10* (2013.01); *C08J 2433/20* (2013.01); *C08J 2497/00* (2013.01)

(58) Field of Classification Search
CPC ........................................................ C08J 9/32
See application file for complete search history.

(56) References Cited

U.S. PATENT DOCUMENTS

2004/0102534 A1* 5/2004 Orpin ........................ C08J 9/32
521/56

FOREIGN PATENT DOCUMENTS

EP 0630956 A2 12/1994

OTHER PUBLICATIONS

Search report and written opinion for corresponding International Application No. PCT/GB2016/051626 dated Jul. 8, 2016.

* cited by examiner

*Primary Examiner* — Peter F Godenschwager
(74) *Attorney, Agent, or Firm* — Tarolli, Sundheim, Covell & Tummino LLP

(57) ABSTRACT

A fire resistant syntactic foam material, the material comprising the reaction product of a reaction mixture including a resole cold curing phenolic resin and incorporating a plurality of hollow spheres, the reaction mixture also including a solution of a partial phosphate ester, a low viscosity phosphate plasticiser, a reinforcing filler and a particulate filler.

15 Claims, 1 Drawing Sheet

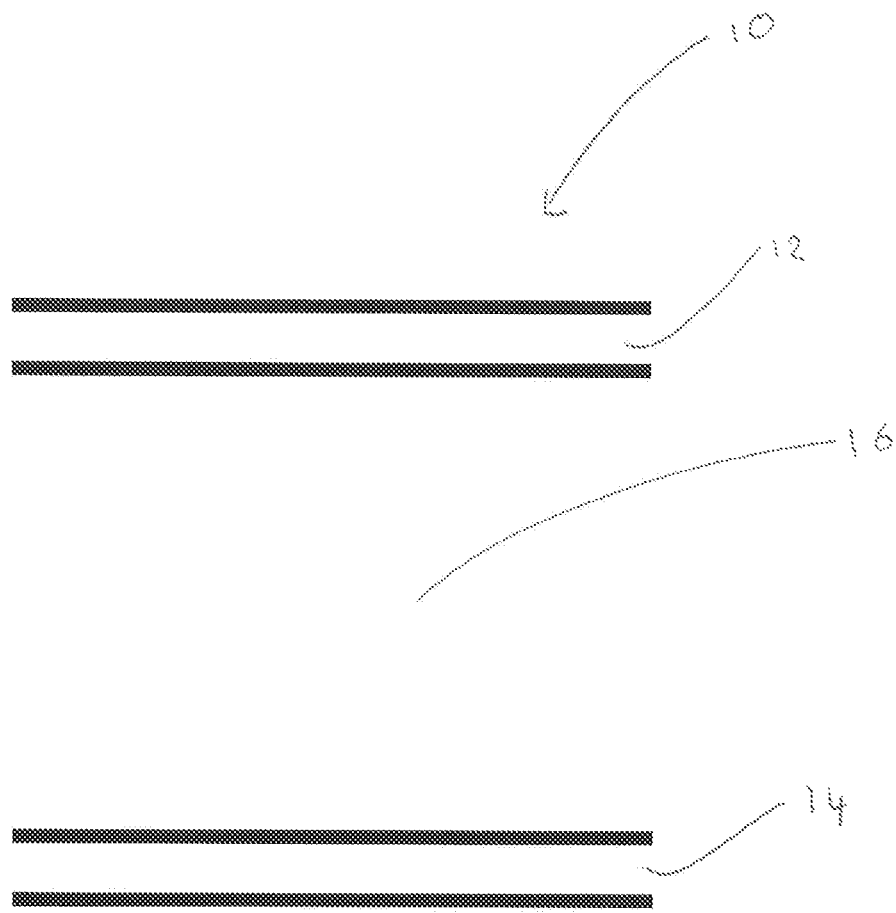

SYNTACTIC FOAM

RELATED APPLICATIONS

The present invention is a U.S. National Stage under 35 USC 371 patent application, claiming priority to Serial No. PCT/GB2016/051626, filed on 2 Jun. 2016; which claims priority of GB 1509865.0, filed on 8 Jun. 2015, the entirety of both of which are incorporated herein by reference.

Embodiments of the present invention relate to syntactic foams. In particular, they relate to fire resistant syntactic foam materials for fabricating and insulating components, partitions and elements of structures, such as oil drilling or production platforms, to provide resistance to fires and the intense heat emanating from combustion of crude oil, or natural gas or their derivatives.

It is common practice to apply intumescent coatings to such structures to protect these structures from structural collapse in the event of a fire on the structure.

These intumescent coatings include compositions of ammonium polyphosphate, a source of carbon such as dipentaerythritol and a spumescent such as melamine, melamine phosphate or dicyandiamide bound in a cold curing two pack epoxy resin. Internal reinforcing agents such as glass fibres and char modifiers such as combinations of zinc and/or borates are frequently added to such compositions. In many cases in such installations it is necessary to provide some form of additional reinforcement to prevent detachment of the foam/char from the steel substrate in the event of a fire situation. These typically consist of a mesh of steel wire embedded in the coating and secured to the steel substrate.

The action of these and other intumescent coatings is to expand from a relatively inert solid to a light weight insulating foam of sufficient durability to withstand the anticipated fire regime. The weight of the fire protection applied to such structures when using these systems is substantial.

It is known that syntactic foams can be used to form a duplex coating in combination with these intumescent materials and hence substitute for a substantial proportion of the thickness of the intumescent coating and provide a method of significantly reducing the weight of the fire protection coating.

Such fire resistant syntactic foam materials may also provide improved thermal insulation to the structure. The benefits of thermal insulation, on for instance delivery pipe work through which crude oil flows, are firstly a higher production rate by maintaining high oil temperature and increasing flow rates. Secondly lower processing costs by elimination of the requirement to reheat crude oil for water separation upon its arrival at the platform. Thirdly the prevention of hydrate and wax formation by maintaining the oil temperature above that at which hydrates form, in turn eliminating pipe blockages which would increase production costs. Fourthly, the elimination of the need for methanol injection to overcome the problems described above. Fifthly a reduction in the requirement for internal cleaning of pipes (known as pipe pigging).

Known fire resistant syntactic foam materials may though explosively decompose during a fire regime leading to a reduction or complete loss of the ability of the material to resist fire and intense heat and to provide thermal insulation. This phenomenon occurs in closed cell insulation materials at or above the temperature at which steam forms, leading to back pressure building within the material, which back pressure causes the material to explode.

During a fire regime known fire resistant syntactic foam materials may also shrink, and crack due to shrinkage stress, which causes a reduction in the thermal insulation and fire resistance properties of such materials.

All proportions in this specification are expressed as weight percentages.

According to a first aspect of the present invention there is provided a fire resistant syntactic foam material, the material comprising the reaction product of a reaction mixture including a resole cold curing phenolic resin and incorporating a plurality of hollow spheres, the reaction mixture also including a solution of a partial phosphate ester, a low viscosity phosphate plasticiser, a reinforcing filler and a particulate filler.

The low viscosity phosphate plasticiser may be present in an amount up to 8.5% by weight of the phenolic resin.

The particulate filler may be any of cork, graphite or vermiculite.

The proportion by weight of the partial phosphate ester to the phenolic resin in the reaction mixture may be in the range of 5% to 15%.

The hollow spheres have a specific gravity which may be in the range of 0.15 to 0.35. The hollow spheres may have an average diameter in the range of 30 to 200 microns. The hollow spheres may be present in a concentration in the range of plus or minus 15% of the volume concentration.

The reaction mixture may include sulphonic acid. The amount of sulphonic acid in the reaction mixture may be up to 6% of the weight of the partial phosphate ester.

The reaction mixture may include trifluoromethanesulfonic acid in an amount up to 6% of the weight of the partial phosphate ester.

The concentration of the hollow spheres may be such that the effective specific gravity of the material is between 0.2 and 0.6.

The hollow spheres may be formed from a material selected from glass, thermoplastic copolymers of polyacrylonitrile, a refractory material, or a ceramic material.

The reinforcing filler may be selected from basalt fibres, ceramic fibres, glass fibres and glass flake.

The reaction mixture may include a surfactant. The surfactant may be a fluorinated surfactant. The surfactant may be acid resistant.

The reaction mixture may include an accelerator. The accelerator may be para-toluene sulfonic acid.

According to a second aspect of the present invention there is provided a two-part system for the production of a fire resistant syntactic foam material, the system comprising a first reactant including a resole cold curing phenolic resin and a second reactant, one or both of which reactants incorporate a plurality of hollow spheres, the second reactant comprising a partial phosphate ester, the spheres being incorporated in one or both of the reactants and the system also incorporating a low viscosity phosphate plasticiser, a reinforcing filler and a particulate filler.

The low viscosity phosphate plasticiser may be present in an amount up to 8.5% by weight of the phenolic resin.

The particulate filler may be any of cork, graphite or vermiculite. The particulate filler may be incorporated in the first reactant.

The phosphate plasticiser may be incorporated in the first reactant.

The second reactant may incorporate para-toluene suphonic acid in an amount up to 6% by weight of the partial phosphate ester.

The second reactant may incorporate trifluoromethane sulphonic acid in an amount up to 6% by weight of the partial phosphate ester.

The hollow spheres may be formed of a material selected from glass, thermoplastic copolymers of polyacrylonitrile, a refractory material, or a ceramic material. The quantity of the hollow spheres may be selected such that the specific gravity of the fire resistant material produced by reaction of the reactants is between 0.2 and 0.6.

The reinforcing filler may be selected from basalt fibres, ceramic fibres, glass fibres and glass flake. The reinforcing filler may be incorporated in the first reactant.

The reaction mixture may also incorporate a surfactant. The surfactant may be a fluorinated surfactant. The surfactant may be acid resistant.

According to a third aspect of the present invention there is provided a method of producing a fire resistant syntactic foam material comprising mixing a resole cold curing phenolic resin incorporating hollow spheres with a further constituent and allowing the mixture to cure at ambient temperature, with the further constituent comprising a solution of a partial phosphate ester, a low viscosity phosphate plasticiser, a reinforcing filler, and a particulate filler.

The particulate filler may be any of cork, graphite or vermiculite.

The hollow spheres may have an effective specific gravity of between 0.15 and 0.35. The hollow spheres may have an average diameter of between 30 and 200 microns. The hollow spheres may be mixed with the further constituent plus or minus 15% of the volume concentration.

The solution of the partial phosphate ester may comprise between 5% and 15% by weight of the phenolic resin.

The resultant material may be in paste form and incorporate a phosphate tri-ester plasticiser in amounts of up to 8.5% by weight of the phenolic resin.

Para-toluene suphonic acid may be added to the phenolic resin in amounts of up to 6% by weight of the partial phosphate ester.

The hollow spheres may be formed from a material selected from glass, thermoplastic copolymers of polyacrylonitrile, a refractory material, or a ceramic material. The addition of the spheres may be controlled to produce a material having an effective specific gravity of between 0.2 and 0.6.

The reinforcing filler may be selected from basalt fibres, ceramic fibres, glass fibres and glass flake.

There may be added to the phenolic resin a surfactant. The surfactant may be a fluorinated surfactant. The surfactant may be acid resistant.

According to a fourth aspect of the present invention there is provided a fire resistant component or structure, the surface thereof being coated with a fire resistant syntactic foam material according to any of the preceding paragraphs.

The fire resistant syntactic foam material may form a core between reinforced phenolic outer layers.

The fire resistant component or structure may be over coated with an intumescent coating.

The fire resistant coating may be between 25% and 75% of the overall thickness of the coating.

The fire resistant component or structure may be overlaid with a lamina of support material bearing a fire resistant or radiant coating. The support material may be any of stainless steel mesh, natural fibre mesh, glass mesh or plastic mesh. The support material may be a paper composed of ceramic fibres. The fire resistant coating may be a silane-modified polyether. The fire resistant coating may be an epoxy coating or silicone coating.

An embodiment of the present invention will now be described by way of example only and with reference to the accompanying drawing, in which:—

FIG. 1 is a diagrammatic cross sectional view of an enclosure according to the invention.

The fire resistant syntactic foam material is derived from a mixture comprising at least two parts, a first part and a second part. The two reactive components of the matrix must be kept separate until they are required to be utilised.

The first reactive component includes of a resol phenolic resin capable of being cold cured, a low viscosity phosphate plasticiser, a reinforcing filler and a particulate filler. The other reactive component includes a solution of a partial phosphate ester, possibly in admixture with accelerating agents, particularly para toluene sulphonic acid or tri-flouromethane sulfonic acid, in water. One or both of the reactive components has hollow glass spheres dispersed within to expand the final mixture to the target specific gravity.

The viscosity of the final mixture may be adjusted by the addition, to both or either, of the reactive components, volatile solvents and/or neutral phosphate plasticisers, such that the wet mixture of all the components can be applied to a substrates with conventional spray equipment, or can be pumped into moulds and will flow as a casting material.

While the hollow spheres described in the following are comprised of glass, providing the material is resistant to heat and the sphere is sufficiently robust to withstand the shear imposed by the mixer conditions then the sphere may be composed of other materials such as carbon or other refractories, providing always that the reduction of the apparent specific gravity is such to ensure that the wall thickness of the sphere is sufficiently low that it provides a very narrow heat flow path.

The level of incorporation specified herein is determined by the sphere diameter and apparent specific gravity.

The manufacture of a structure coated with a fire resistant syntactic foam material requires three steps, and the method is illustrated in summary below. However, the distribution of the components of the formulation, between the two components and the means of incorporation and application are not fixed or limited by this description.

Preparation of Phenolic Foam Paste (Step 1)

(1) Select a paste mixer of the trifoil, Z blade or dough mixer type with close control of the rotor speed and shear rate. The mixing pan must be sealed to prevent nuisance dust. A pumped or extruder type discharge system will be required.
(2) Add to the paste mixer the charge of phenolic resin, phosphate plasticiser, and wetting agent. Mix thoroughly.
(3) Add any requisite charge of reinforcing fibre. Disperse this addition.
(4) With the rotor operating at very slow speed, add the charge of glass spheres.
(5) Mix slowly until all the spheres are wetted and incorporated in thick creamy paste.
(6) Discharge.

Preparation of Curing Agent (Step 2)

(1) To a stainless steel vessel with a slow speed paddle, add water.
(2) Add Para-toluene sulphonic acid and stir until dissolved.
(3) Add solution of acid partial phosphate ester.
(4) Add and mix methoxy-propanol solvent if required.
(4) Discharge.

Spray Procedure (Step 3)

(1) Mix phenolic foam with requisite quantity of curing agent, in the spray container using a pneumatic stirrer or similar until the curing agent is fully incorporated. The mixed components have a pot life of approximately one hour at 20° C. Application must be completed within this time. All vessels and apparatus may be water rinsed proving the foam is not cured.

(2) Spray the mixture onto the substrate using conventional spray equipment fitted with any arrangement that will ensure continuous delivery of the paste to an airless pump head.

(3) Wet film thicknesses of 15 mm can be obtained. The foam will cure overnight at room temperature.

Alternatively, the mixture can be cast instead of sprayed. Casting is conventional except that a pump may be used to inject the material into the casting moulds. Curing in closed mould conditions will be substantially faster than for a sprayed film.

EXAMPLES

Examples 1 to 4 below are typical formulations according to the invention.

|  | Example 1 | Example 2 | Example 3 | Example 4 |
|---|---|---|---|---|
| First Part |  |  |  |  |
| Resole cold curing phenolic resin | 60.05 | 60.05 | 62.5 | 63 |
| Phosphate Plasticiser | 5.1 | 5.1 | 3 | 5 |
| Silane Adhesion Promoter | 0.67 | 0.67 | 0.55 | 0.7 |
| Surfactant | 0.30 | 0.3 | 0.3 | 0.35 |
| Glass fibres | 1.51 | 0 | 0 | 1.75 |
| Basalt fibres | 0 | 1.51 | 2 | 1 |
| Ceramic Fibres | 1.51 | 1.51 | 1 | 1.5 |
| Thermoplastic Spheres | 3.44 | 3.44 | 0 | 0 |
| Hollow glass spheres | 10.85 | 10.85 | 14.27 | 14.41 |
| 3 mm Cork Granules | 8.24 | 8.24 | 0 | 0 |
| Vermiculite | 0 | 0 | 8.2 | 0 |
| Graphite | 0 | 0 | 0 | 2 |
| Second Part |  |  |  |  |
| Para-toluene sulphonic acid | 0.42 | 0.42 | 0.45 | 0.5 |
| Partial Phosphate Ester | 7.49 | 7.69 | 7.34 | 9.49 |
| Trifluromethanesulphonic acid | 0.42 | 0.22 | 0.39 | 0.3 |

Regarding example 1 above, the specific gravity of the cured material is 0.35.

After mixing the first and second parts as per step 3 of the manufacturing process described above, the mixture is cast and cured at ambient temperature. The resulting fire resistant syntactic foam material was used to prepare a fire resistant enclosure (10) and subjected to a two hour jet fire test according to ISO 22899-1. The maximum temperature observed was 145.5° C. (Maximum temperature rise allowable is 400° C.).

The material of the enclosure (10) was made up of three layers as shown in FIG. 1. The inner layer (12) is a 2 mm thick phenolic laminate system. The outer layer (14) is a 3 mm thick phenolic laminate system, and the internal layer (16) is the syntactic foam material of example 1. The thickness of the internal layer is a 50 mm.

The main components of the examples of the present invention provide at least the following functions.

(1) Phenolic resins. The cold curing resins are resoles. For the purposes of the present application the lowest possible viscosity resin used is typically below 500 c.poise.

(2) Phosphate plasticiser. The viscosity of the mixture of the uncured syntactic foam is adjusted with up to 8.5% of the weight of the phenolic resin with a phosphate triester plasticiser. Any low viscosity phosphate plasticiser may be used such as di methyl methyl phosphonate, or Trichloroethyl phosphate.

(3) Surfactant. The incorporation of the hollow spheres into the phenolic resins is improved by the addition of a fluorinated surfactant. The efficacy of the formulation both in terms of cohesion and adhesion and the ease of incorporation and of flow is greatly aided by the presence of suitable surfactants. These must be both temperature and acid stable and soluble in aqueous media.

(4) Hollow glass spheres. As the effectiveness of the product in terms of thermal conductivity depends on providing a low thermal conductivity path through the foam then the lightest hollow glass sphere, consistent with durability in mixing and application is satisfactory. That the sphere shatters when exposed to stress or stain is irrelevant with respect to the prevention of incipient cracks, which depends only on the sphere diameter. Further, the careful adjustment of the resin viscosity, the incorporation of suitable wetting agents and the control of the mixer speed are necessary to prevent the rupture of the very light filler incorporated in this invention. Typically the preferred sphere will expanded from borosillicate glass with an effective specific gravity of 0.15-0.35 and have a mean particle diameter of 30-200 microns.

Within the prescribed materials the effective specific gravity of the foam is adjusted by varying the rate of addition of the hollow glass spheres to between 0.30 and 0.6. The examples provided utilise hollow spheres composed of glass, although hollow spheres composed of refractory or ceramic materials would be equally efficacious.

(5) Conventionally, the acid curing agents used with cold curing phenolic resins have been partially neutralised phosphoric acid. Esters of ortho and higher condensed phosphoric acids suitably accelerated with other acids such as para-toluene sulphonic acids give a slower more thorough cure to the cold curing resins specified herein.

Further, because the acid value of the partial phosphate esters is lower than for the neutralised phosphoric acids but the pKa value of the residual oxyphosphorous functionality is similar a greater quantity of such partial phosphate ester curing agent is required to react with the methalol functionality of the resin. In the present application the greater quantity of curing agent added is critical in reducing the mix viscosity to allow the paste to both flow and be sprayed.

The quantity of partial phosphate ester required to cure the phenolic resin is dependent on the methalol functionality of the phenolic resin. This functionality defines a concentration of partial phosphate ester of between 5 and 15% of partial phosphate ester calculated on the solids of both the partial phosphate ester and the phenolic resin.

(6) Accelerators. The cure rate of the curing system is controlled by the addition of para-toluene sulphonic acid or triflouromethanesulfonic acid of up to 5% of the weight of the partial phosphate ester.

(7) Reinforcing filler. Additionally the strength of the foam under fire conditions is advantageously modified by the addition of reinforcing fillers such as basalt fibres, ceramic fibres, glass fibres or glass flake. These materials control the mode of thermal decomposition of the structure and can reduce cracking. Reinforcing fillers therefore provide a material with enhanced durability.

(8) Particulate filler. The composition also includes discrete particles in the form of particulate fillers. Examples of suitable particulate fillers include cork, graphite and vermiculite. Particulate fillers improve the integrity of the syntactic foam material during a fire regime and improve the physical properties of the syntactic foam material.

Particulate fillers substantially prevent the syntactic foam material explosively decomposing during a fire regime, which would otherwise lead to a reduction or complete loss of the ability of the material to resist fire and intense heat and to provide thermal insulation. This phenomenon occurs in closed cell insulation materials at or above the temperature at which steam forms, leading to back pressure building within the material which back pressure causes the material to explode.

Particulate fillers also reduce shrinkage and crack formation of the syntactic foam material and allow for out-gassing during a fire regime. Graphite, for instance, expands when heated reducing shrinkage of the syntactic foam material during a fire regime.

There is thus described a fire resistant syntactic foam material with a number of advantages. As indicated above the addition of a particulate filler to the material provides a material with an improved performance by being resistant to explosive decomposition, shrinkage and cracking during a fire regime.

Although embodiments of the present invention have been described in the preceding paragraphs with reference to various examples, it should be appreciated that modifications to the examples given can be made without departing from the scope of the invention as claimed. For example, different materials or different proportions of materials may be used.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A fire resistant syntactic foam material, the material comprising the reaction product of a reaction mixture including a resole cold curing phenolic resin and incorporating a plurality of hollow spheres, the reaction mixture also including a solution of a partial phosphate ester, a phosphate plasticiser, a reinforcing filler and a particulate filler, wherein the particulate filler is any of cork, graphite or vermiculite, and wherein the reaction mixture includes 2-8.24% by weight of the particulate filler.

2. A fire resistant foam material according to claim 1, wherein the phosphate plasticiser is present in an amount up to 8.5% by weight of the phenolic resin.

3. A fire resistant foam material according to claim 1, wherein the proportion by weight of the partial phosphate ester to the phenolic resin in the reaction mixture is in the range of 5% to 15%.

4. A fire resistant foam material according to claim 1, wherein the reaction mixture includes sulphonic acid.

5. A fire resistant foam material according to claim 4, wherein the amount of sulphonic acid in the reaction mixture is up to 6% of the weight of the partial phosphate ester.

6. A fire resistant foam material according to claim 1, wherein the reaction mixture includes trifluoromethanesulfonic acid in an amount up to 6% of the weight of the partial phosphate ester.

7. A fire resistant foam material according to claim 1, wherein the concentration of the hollow spheres is such that the effective specific gravity of the material is between 0.2 and 0.6.

8. A fire resistant foam material according to claim 1, wherein the hollow spheres are formed from a material selected from glass, thermoplastic copolymers of polyacrylonitrile, a refractory material, or a ceramic material.

9. A fire resistant foam material according to claim 1, wherein the reinforcing filler is selected from basalt fibres, ceramic fibres, glass fibres and glass flake.

10. A fire resistant foam material according to claim 1, wherein the reaction mixture includes a surfactant.

11. A fire resistant foam material according to claim 10, wherein the surfactant is a fluorinated surfactant.

12. A fire resistant foam material according to claim 10, wherein the surfactant is acid resistant.

13. A fire resistant foam material according to claim 1, wherein the reaction mixture includes an accelerator.

14. A fire resistant foam material according to claim 13, wherein the accelerator is para-toluene sulfonic acid.

15. A fire resistant component or structure, the surface thereof being coated with a fire resistant syntactic foam material according to claim 1.

\* \* \* \* \*